Aug. 28, 1923.　　　　　　　　　　　　　　　　　1,466,133
C. G. LUNDSTROM
RESILIENT TIRE
Filed Sept. 13, 1921　　　2 Sheets-Sheet 1
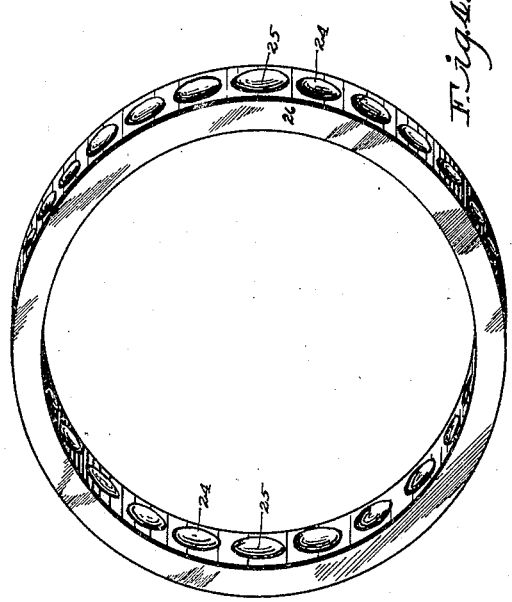
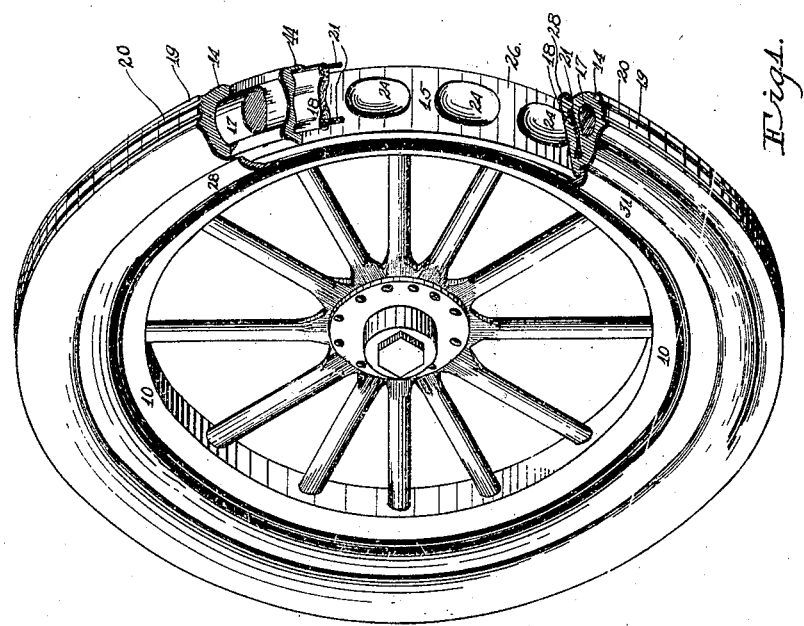
Inventor
Carl G. Lundstrom
by Irving & Hague Att'ys

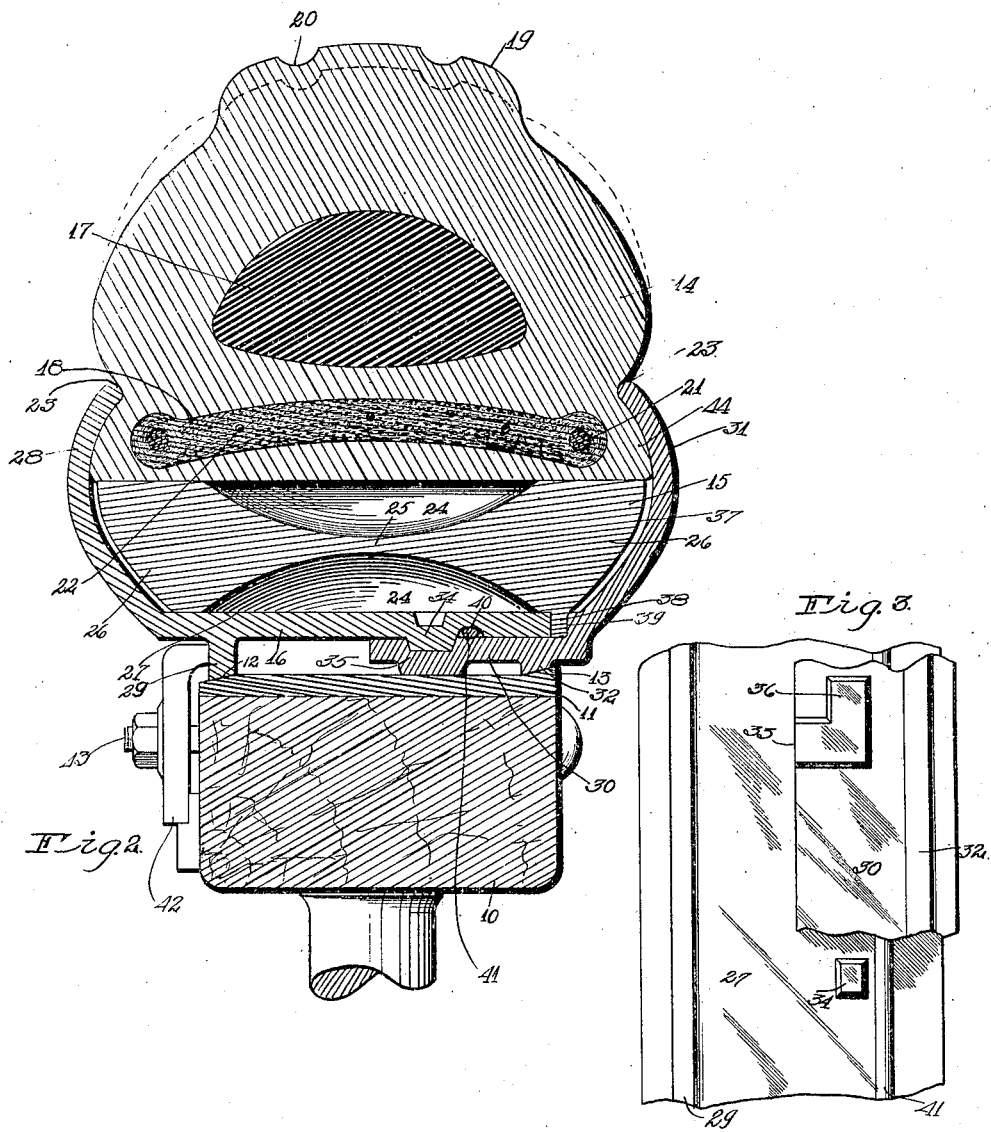

Patented Aug. 28, 1923.

1,466,133

UNITED STATES PATENT OFFICE.

CARL G. LUNDSTROM, OF BOONE, IOWA.

RESILIENT TIRE.

Application filed September 13, 1921. Serial No. 500,422.

*To all whom it may concern:*

Be it known that I, CARL G. LUNDSTROM, a citizen of the United States, and a resident of Boone, in the county of Boone and the State of Iowa, have invented a certain new and useful Resilient Tire, of which the following is a specification.

The object of my invention is to provide a resilient tire for vehicle wheels, of simple, durable and inexpensive construction arranged with a tread having a cushion member, mounted in such a manner that the tread member may be held firmly in position relative to the cushion member, and at the same time be adapted to be removed without having to renew the cushion member, whenever the said tread member has become worn.

A further object is to provide a resilient tire for vehicle wheels, formed of a material having different degrees of resiliency and constructed in such a manner that the tire is adapted to carry variable loads and at the same time produce maximum shock absorbing qualities, either loaded or unloaded.

A further object is to provide in a resilient tire for vehicle wheels having a series of separate and co-acting and resilient members, new and improved means for securing the said resilient members together and to the wheel of a vehicle.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of my improved resilient tire showing the manner in which it is applied to a vehicle wheel, and also showing a portion of the tread member broken away to show its construction.

Figure 2 is a detail transverse sectional view taken through the felly and my improved tire.

Figure 3 is a segmental detail view of the rim flanges showing the manner in which they are locked together.

Figure 4 is a perspective view of the cushion portion of my improved tire.

The numeral 10 indicates the felly of an automobile wheel which is provided with the usual felly band 11 such as is used with demountable rims. This band is rigidly secured to the felly and provided with an inclined edge 12 and also an inclined annular flange 13.

My improved tire comprises substantially a tread member 14, a cushion member 15 and a rim member 16. The tread member 14 comprises substantially an outer portion 14 and a core portion 17 and a reinforcing portion 18. The outer portion 14 is formed of comparatively resilient rubber and is provided with a tread 19.

This tread portion 19 may be provided with annular corrugations or grooves 20 for the purpose of preventing the tire from slipping or skidding. The tread portion is formed substantially semi-circular in cross sections and is provided with a core 17 of semi-circular cross section which is formed of a substance of a more solid nature than the tread portion.

This core 17 extends throughout the full length of the tire and is vulcanized therein. The reinforcing member 18 is secured near the inner face of the tread and is provided with annular metallic cables 21 which are secured near the side portions of the said tread. The flexible member is formed of a series of layers of vulcanized fabric. This fabric is arranged in layers in such a manner that the said layers surround the cables, and which are also provided with a series of small reinforcing flexible wires 22. The tread 14 is provided with an annular groove 23 in each of its faces which is for the purpose of receiving the rim flanges. The member 18 is formed with its central portion bulged or arched, as shown in Figure 2, and is vulcanized into the soft rubber portion 14.

The inner face of the tread portion 14 is formed cylindrical and smooth and is designed to receive an annular cushion portion 15, which is formed of very soft and resilient rubber and provided with a series of oppositely arranged concave pockets 24. The bottom portion of said pockets being separated by a thin layer 25 of the cushion rubber. These pockets are of such diameter that a solid portion 26 is provided at each edge of the cushion member. This cushion member is formed of a continuous piece of material and may be inserted within the inner face of the tread portion 14, and is of a slightly less width than the said tread portion.

For locking the cushion portion and the tread portion together and to a wheel, I have provided the rim 16 which is formed of two pieces, one having an annular portion 27 of a width substantially equal to the width of the inner face of the cushion member, which is of considerable less width than its outer face. The outer edge of the flange 27 is provided with an outward and curved flange 28 having its outer edge entering one of the grooves 23 of the tread member 14.

This flange 27 is provided with an annular flange 29, the inner edge of which is beveled to coact with the beveled edge 12, and is of substantially the same diameter. The other member of the rim 16 is provided with an annular portion 30 having an outwardly extending flange 31 which is curved in the opposite direction from the flange 28, and having its free edge designed to enter the opposite one of the grooves 23.

This annular member 30 is also provided with an annular beveled portion 32 which is designed to coact with the beveled portion 13. The outer diameter of the annular member 30 is slightly less than the inner diameter of the annular member 27 so that the said annular member 30 may enter the said flange 27. The annular members are locked in position relative to each other by a series of bayonet joints 33 which comprise lugs 34 formed in the member 27 extending inwardly and designed to coact with the transversely arranged groove portions 35 communicating with the longitudinal groove portions 36 and placed together by placing the grooves 35 in line with the lugs 34 and moving the member 30 transversely and inwardly until the lugs 34 are in line with the grooves 36, after which a rotary movement is imparted to the member 30 until the said lugs enter the grooves 36.

When the portions 27 and 30 have been placed together as just described with the cushion 26 and the tread 14 in position, spaces 37 will be formed between either edge of the cushion and the inner face of the flanges 28 and 31, due to the fact that the said cushion member is of a slightly less width than the tread member, as before described. These spaces are for the purpose of permitting the cushion member 26 to be contracted in thickness which will cause it to be slightly increased in width.

To prevent moisture and dirt from entering the spaces 37 and the pockets 24, I have provided a small annular flange portion 38 on one edge of the inner face of said cushion portion designed to enter the groove formed by the edge of the member 27 and the shoulder 39 on the inner face of the flange 31. The shoulder 39 being designed to engage the portion 38 as the annular members are placed in their locked position.

To further assist in keeping out the moisture, I have provided an annular groove 40 on the inner face of the member 27 which is designed to receive a resilient packing member 41 which may be formed of any suitable material.

The sectional area of said resilient member 41 being of a diameter slightly greater than the depth of the groove 40, the said resilient member being placed in the groove 40 before the members 27 and 30 are assembled, so that as the member 30 is placed in position within the member 27, the resilient member 41 will be compressed in the groove 40 by the member 27 being moved into position.

It will thus be seen that I have provided a resilient tire having a tread portion and a cushion portion which are locked together by means of the rim 16, the tread portion of which may be easily and quickly removed when so desired by simply pressing the groove portions 23 together by means of a special mechanism not shown, after which the members 30 and 27 are free to rotate relative to each other and may be easily and quickly detached when the lugs 34 have reached the grooves 35. A new tread may be placed in position by a reverse operation as just described.

The rim 16 with the tread portion and cushion portion now forms a unit which may be placed on the felly band, as clearly shown in Figure 2, and held in position by means of lugs 42 and bolts 43 which are of the ordinary construction and form no particular part of my present invention.

The operation of my tire in action is substantially as follows:

Assuming that the wheel is loaded and that the tread portion 19 is in engagement with the ground surface, the said tread portion 19 and also the outer portion 14 are formed of a tough and quite resilient material so that the said tread portion will yield slightly under the load and will cause the edges of the member 14 to bulge slightly as indicated by dotted lines. The core 17 should be designed stiff enough so as to carry a load without being distorted or moved materially from its normal position. This is accomplished by the fact that the said member is stiff and distributes the load over a considerable area of the resilient rubber portion engaging its inner face which also indirectly distributes the load on the cushion portion 26. But if a shock is imparted to the tread portion of the tire, which is the same as increasing the load several times, the resiliency of the core 17 should be such that it will be distorted or bent inward somewhat causing the reinforcing fabric 18 to assume nearly a straight line. This will cause the pressure to be applied to the cushion 26 which will yield and become thinner and slightly wider, thus permitting the shock to be cushioned without injuriously distorting the tread portion, and yet at the same time to keep the said tread portion in a substantially circular form under normal loads and conditions.

It will be noted that as the fabric portion 18 assumes a straight line the cables 21 will be moved outward. This will have a tendency to cause the bulged portions 44 to engage the curved portions of the members 28 and 31 tighter. If the member 18 were formed straight instead of arched, when the inward movement occurred, the arch would be formed in an opposite direction, causing the cable 21 to be moved inward, and thereby, the bulged portions 44 loosened from the flanges 28 and 31. This would permit the said bulged portions to move relative to the said flange portions, the groove portions 23 would become quickly cut and worn, as well as the co-acting faces of the bulged portions.

By employing the pockets 24, a sort of air cushion is formed therein which adds to the resiliency of the tire, and these pockets also help to make the inner portion of the cushion more resilient than the outer edges in such a manner that the said outer edges will be rigid enough to carry the loads without settling materially. This also assists in preventing the bulged portions 44 from moving relative to the inner faces of the flanges.

The member 18 serves the purpose of preventing the tread member from stretching and forms a flexible foundation for the tread member. The member 18 may be provided with as many flexible wires 22 as it is found to be necessary in order to give the said member 18 the proper tensile strength. The tread portion will be held against slipping longitudinally in the flanges 28 and 31 due to the torsion of the driving wheels.

Thus it will be seen that I have provided a resilient tire of comparatively simple, durable and inexpensive construction which is very resilient, and which is especially adapted to carry variable loads, and having a tread portion which may be renewed at such times as is found necessary, but without going to the expense of renewing the entire tire portion.

I claim as my invention:

1. In a device of the class described, a resilient annular tread portion having an annular core at its central portion of a less resilient material, and a flexible reinforcing member between the said core and the inner face of said annular tread portion.

2. In a device of the class described, a resilient annular tread portion having an annular core at its central portion of a less resilient material, and a flexible reinforcing member between the said core and the inner face of said annular tread portion, an annular cushion portion within the tread portion, detachable means for locking said tread portion and said cushion portion together.

3. In a device of the class described, an annular resilient tread member having an annular central core member, a reinforcing member in said tread member between the core and its inner annular face, said reinforcing member comprising a series of spaced annular cables, and a series of intermediate flexible wires, the said wires and cables being mounted in a series of layers of vulcanized fabric.

4. In a device of the class described, an annular resilient tread member having an annular central core member, a reinforcing member in said tread member between the core and its inner annular face, said reinforcing member comprising a series of spaced annular cables, and a series of intermediate flexible wires, the said wires and cables being mounted in a series of layers of vulcanized fabric, an annular cushion within said tread member and means for detachably securing said cushion and said tread members together.

5. In a device of the class described, an annular resilient tread member having an annular central core member, a reinforcing member in said tread member between the core and its inner annular face, said reinforcing member comprising a series of spaced annular cables, and a series of intermediate flexible wires, the said wires and cables being mounted in a series of layers of vulcanized fabric, an annular cushion member within the inner face of said annular tread member formed of a material having higher resiliency than the tread member, and having its annular faces formed with oppositely arranged concave pockets, detachable means for securing said tread member and said cushion member together.

6. In a device of the class described, an annular resilient tread member having an annular central core member, a reinforcing member in said tread member between the core and its inner annular face, said reinforcing member comprising a series of spaced annular cables, and a series of intermediate flexible wires, the said wires and cables being mounted in a series of layers of vulcanized fabric, an annular cushion member within the inner face of said annular tread member formed of a material having higher resiliency than the tread member, and having its annular faces formed with oppositely arranged concave pockets, said cushion being of a less width than the inner face of said tread member, annular rim members for engaging the inner side edges of said tread member and the inner annular face of said cushion member for locking said tread member and said cushion member together, and to provide expansion spaces at the edges of said cushion member.

7. In a device of the class described, an annular cushion member having inner and outer parallel faces, each of said faces being provided with a series of concave pockets, the inner face being of less width than its outer face and having one edge provided with an inwardly extending annular flange portion.

8. In a device of the class described, an annular resilient tread member having an annular central core member, a reinforcing member in said tread member between the core and its inner annular face, said reinforcing member comprising a series of spaced annular cables, a series of intermediate flexible wires, the said wires and cables being mounted in a series of layers of vulcanized fabric, and an annular cushion within said tread member.

Des Moines, Iowa, February 28, 1921.

CARL G. LUNDSTROM.